US011363610B2

United States Patent
Furuichi

(10) Patent No.: US 11,363,610 B2
(45) Date of Patent: Jun. 14, 2022

(54) COMMUNICATION CONTROL DEVICE, COMMUNICATION CONTROL METHOD, AND COMPUTER PROGRAM

(71) Applicant: Sony Corporation, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 30 days.

(21) Appl. No.: 16/955,786

(22) PCT Filed: Nov. 22, 2018

(86) PCT No.: PCT/JP2018/043096
§ 371 (c)(1),
(2) Date: Jun. 19, 2020

(87) PCT Pub. No.: WO2019/130922
PCT Pub. Date: Jul. 4, 2019

(65) Prior Publication Data
US 2020/0344766 A1 Oct. 29, 2020

(30) Foreign Application Priority Data

Dec. 28, 2017 (JP) .............................. JP2017-254216

(51) Int. Cl.
*H04W 72/08* (2009.01)
*H04L 5/14* (2006.01)

(52) U.S. Cl.
CPC ............. *H04W 72/082* (2013.01); *H04L 5/14* (2013.01)

(58) Field of Classification Search
None
See application file for complete search history.

(56) References Cited

U.S. PATENT DOCUMENTS

| 8,315,663 | B2* | 11/2012 | Hamdi | H04W 52/283 |
|---|---|---|---|---|
| | | | | 455/67.11 |
| 8,391,742 | B2* | 3/2013 | Kakitani | G03G 15/0898 |
| | | | | 399/119 |
| 8,818,284 | B2* | 8/2014 | Hochstedler | H04W 16/14 |
| | | | | 455/62 |

(Continued)

FOREIGN PATENT DOCUMENTS

| JP | 2013-078096 A | 4/2013 |
|---|---|---|
| WO | 2014/006802 A1 | 1/2014 |

OTHER PUBLICATIONS

"IEEE Standard for Information technology—Telecommunications and information exchange between systems—Local and metropolitan area networks—Specific requirements—Part 19:TV White Space Coexistence Methods—Amendment 1: Coexistence Methods for Geo-location Capable Devices Operating under General", IEEE Standard, IEEE, Piscataway, NJ USA, Dec. 11, 2017 (Dec. 11, 2017), pp. 1-295, XP068123626, DOI: 10.1109/1EEESTD.2017. 8207799 ISBN: 978-1-5044-4299-2 [retrieved on Dec. 14, 2017].

(Continued)

*Primary Examiner* — Jamaal Henson
(74) *Attorney, Agent, or Firm* — Xsensus, LLP

(57) ABSTRACT

A communication control device is provided. The communication control device includes a controller that sets an acceptable interference amount of a primary system that is acceptable by a secondary system that secondarily uses a radio wave in a predetermined frequency band allocated to the primary system. In the setting of the acceptable interference amount, the controller sets a first margin to be allocated to the secondary system that is operating, a second margin that absorbs a change in the first margin that has been caused by a change in the total number of secondary systems, and a third margin to be commonly set between the communication control device and another communication control device.

14 Claims, 16 Drawing Sheets

(56) References Cited

U.S. PATENT DOCUMENTS

| | | | | |
|---|---|---|---|---|
| 9,467,864 B2* | 10/2016 | Bai | | H04W 16/14 |
| 10,616,898 B2* | 4/2020 | Je | | H04W 72/082 |
| 2004/0092281 A1* | 5/2004 | Burchfiel | | H04B 7/0408 |
| | | | | 455/448 |
| 2009/0312028 A1* | 12/2009 | Burchfiel | | H04B 7/0408 |
| | | | | 455/450 |
| 2010/0272038 A1* | 10/2010 | Hamalainen | | H04W 16/14 |
| | | | | 370/329 |
| 2011/0028179 A1* | 2/2011 | Sawai | | H04W 52/245 |
| | | | | 455/522 |
| 2011/0028180 A1* | 2/2011 | Sawai | | H04W 64/00 |
| | | | | 455/522 |
| 2012/0064928 A1* | 3/2012 | Burchfiel | | H04W 52/343 |
| | | | | 455/501 |
| 2013/0339353 A1* | 12/2013 | Emmelmann | | G06F 16/29 |
| | | | | 707/736 |
| 2014/0219235 A1* | 8/2014 | Kimura | | H04W 52/243 |
| | | | | 370/329 |
| 2015/0289143 A1* | 10/2015 | McHenry | | H04W 64/006 |
| | | | | 455/67.13 |
| 2015/0333853 A1 | 11/2015 | Sawai | | |
| 2017/0353261 A1* | 12/2017 | Sun | | H04W 16/14 |
| 2017/0353857 A1* | 12/2017 | Ojanen | | H04W 24/08 |

OTHER PUBLICATIONS

International Search Report and Written Opinion dated Feb. 12, 2019 for PCT/JP2018/043096 filed on Nov. 22, 2018, 6 pages including English Translation of the International Search Report.

* cited by examiner

COMMUNICATION CONTROL DEVICE, COMMUNICATION CONTROL METHOD, AND COMPUTER PROGRAM

CROSS-REFERENCE TO RELATED APPLICATIONS

The present application is based on PCT filing PCT/JP2018/043096, filed Nov. 22, 2018, which claims priority to JP 2017-254216, filed Dec. 28, 2017, the entire contents of each are incorporated herein by reference.

FIELD

The present disclosure relates to a communication control device, a communication control method, and a computer program.

BACKGROUND

Due to a recent wireless environment in which a wide variety of wireless systems exist, and increases in and diversification of content volumes via radio, the problem of depletion of wireless resources (frequencies) that are allocatable to wireless systems has surfaced. However, since all radio bands have already been used by existing wireless systems, it has proven difficult to allocate a new radio wave resource. Therefore, to obtain a necessary radio wave resource, using and taking advantage of a temporal and spatial available radio wave (white space) of an existing wireless system (dynamic spectrum access (DSA)) via a cognitive wireless technique have begun to be required. In recent years, in the United States, the legislation and standardization of Citizens Broadband Radio Service (CBRS) taking advantage of the spectrum access technique are accelerating in order to aim to open, to the general public, a federal use band (3.55 to 3.70 GHz) overlapping frequency bands that are globally the 3GPP bands 42 and 43.

In addition, the cognitive wireless technique also contributes to not only the dynamic spectrum access but also an improvement in the efficiency of using frequencies by wireless systems. For example, in ETSI EN 303 387 and IEEE 802.19.1-2014, a coexisting technique between wireless systems using the white space is defined. In addition, in Wireless Innovation Forum (WinnForum), the standard that is the SAS-SAS protocol disclosed in Non-Patent Literature 1 and is related to an exchange of information between a plurality of SASs that are frequency management databases for CBRS has been developed.

CITATION LIST

Patent Literature

Non-Patent Literature 1: "Signaling Protocols and Procedures for Citizens Broadband Radio Service (CBRS): Spectrum Access System (SAS)-SAS Interface Technical Specification", WINNF-TS-0096, the Internet <URL: https://workspace.winnforum.org/higherlogic/ws/public/document?document_id=4813>

SUMMARY

Technical Problem

When real-time management is performed by exchanging individual information recorded in the frequency management databases as appropriate, a large load is applied to the databases. It is therefore assumed that an operation load of the databases is reduced by periodically (for example, once a day) exchanging exchange. However, when the exchange is periodically performed, the databases may be subject to some interference. It is therefore necessary that a communication device that needs to quickly start the operation even when the communication device receives some interference stand by for a while until the operation is permitted, and thus the operation of the databases is inconvenient.

Therefore, the present disclosure proposes a communication control device, a communication control method, and a computer program that have been newly improved and can reduce a recalculation load of interference control that may occur due to a change in an operation state of a wireless system within a time interval between periodical exchanges of information between databases in secondary use by the wireless system.

Solution to Problem

According to the present disclosure, a communication control device is provided that includes: a controller that sets an acceptable interference amount of a primary system that is acceptable by a secondary system that secondarily uses a radio wave in a predetermined frequency band allocated to the primary system, wherein in the setting of the acceptable interference amount, the controller sets a first margin to be allocated to the secondary system that is operating, a second margin that absorbs a change in the first margin that has been caused by a change in the total number of secondary systems, and a third margin to be commonly set between the communication control device and another communication control device.

Moreover, according to the present disclosure, a communication control method is provided that includes: causing a processor to execute control to set an acceptable interference amount of a primary system that is acceptable by a secondary system that secondarily uses a radio wave in a predetermined frequency band allocated to the primary system, wherein in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set.

Moreover, according to the present disclosure, a computer program is provided that causes a computer to execute control to set an acceptable interference amount of a primary system that is acceptable by a secondary system that secondarily uses a radio wave in a predetermined frequency band allocated to the primary system, wherein in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set.

Advantageous Effects of Invention

As described above, according to the present disclosure, it is possible to provide a communication control device, a communication control method, and a computer program that have been newly improved and can reduce a recalculation load of interference control that may occur due to a change in an operation state of a wireless system within a time interval between periodical exchanges of information between databases in secondary use by the wireless system.

The foregoing effects are not necessarily limited and any of effects indicated in the present specification or another effect that may be recognized from the present specification may be achieved together with or instead of the foregoing effects.

DESCRIPTION OF EMBODIMENT

Figure 1:
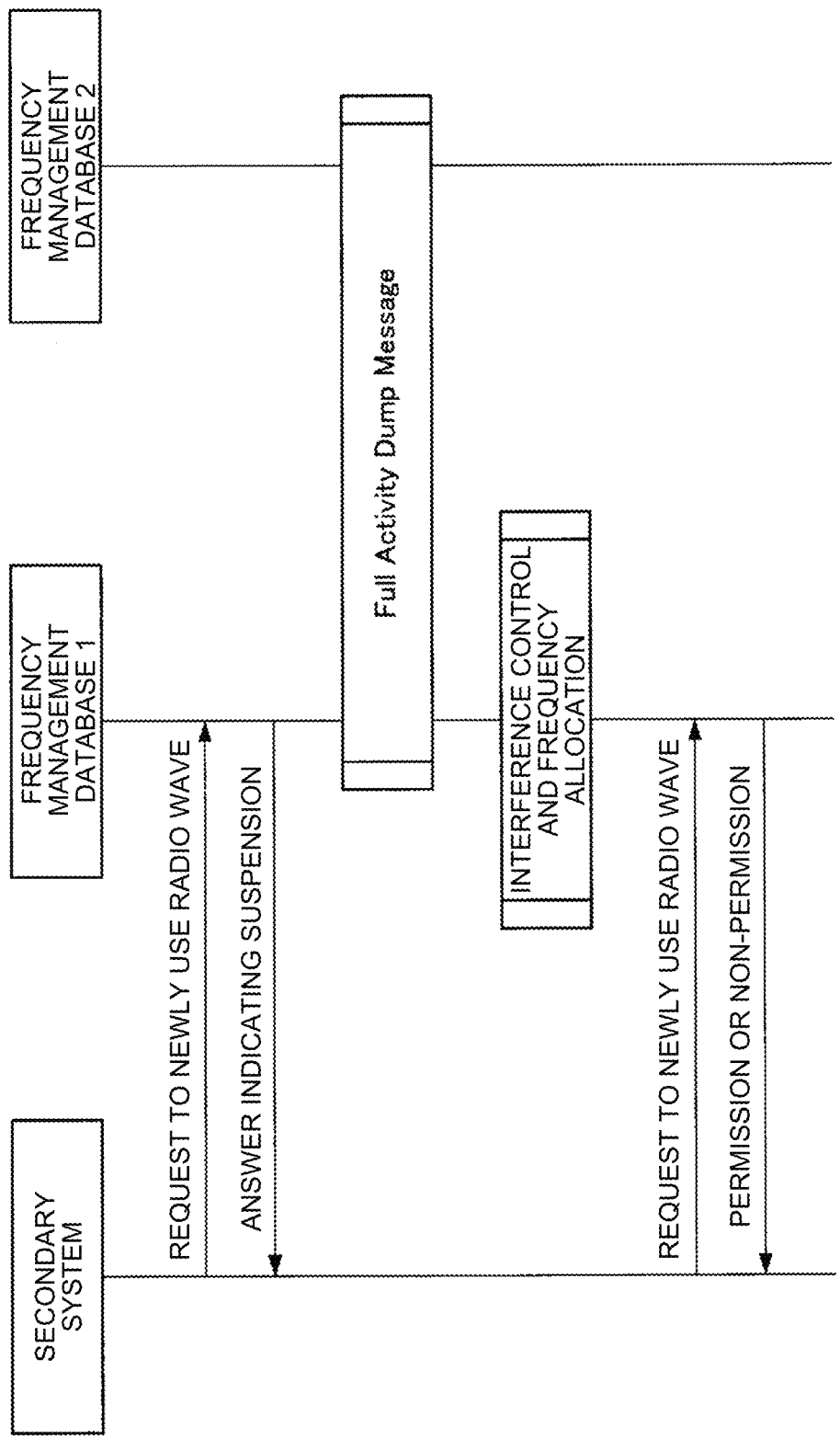
FIG. 1 is an explanatory diagram illustrating an example of operating SASs.

Hereinafter, a preferred embodiment of the present disclosure is described in detail with reference to the accompanying drawings. Constituent elements with substantially the same functional configurations are indicated by the same reference signs, and a duplicate description is omitted.

It should be noted that the description is provided in the following order.
1. Embodiment of Disclosure
1.1. Background
1.2. Overview
1.3. Example of Configuration
2. Conclusion 1. Embodiment of Disclosure 1.1. Background Before an embodiment of the present disclosure is described, the background to the embodiment of the present disclosure is described.

As described above, to obtain a necessary radio wave resource, using and taking advantage of a temporal and spatial available radio wave (white space) of an existing wireless system (dynamic spectrum access) via the cognitive wireless technique have begun to be required. In recent years, in the United States, the legislation and standardization of Citizens Broadband Radio Service (CBRS) taking advantage of the spectrum access technique are accelerating in order to aim to open, to the general public, a federal use band (3.55 to 3.70 GHz) overlapping frequency bands that are globally the 3GPP bands 42 and 43.

For example, in ETSI EN 303 387 and IEEE 802.19.1-2014, a coexisting technique between wireless systems using the white space is defined. In addition, in WinnForum (Wireless Innovation Forum), the standard that is the SAS-SAS protocol disclosed in Non-Patent Literature 1 and is related to an exchange of information between a plurality of SASs that are frequency management databases for CBRS has been developed.

Among the standards, there is a Full Activity Dump message and a technique for synchronizing the minimum required information as a dump with interference control recorded in a database is provided. The Full Activity Dump message includes a CBSD Data record, a Zone Data record, and an ESC Sensor record. The CBSD Data record includes base station installation position information and operation parameters (frequency and transmission power). The Zone Data record includes a PAL Protection Area (PPA, a protection area of a secondary use system with a high priority). The ESC Sensor record includes installation position information of a sensor for detecting a military radar signal.

Although it is considered that real-time management is performed by exchanging individual information as appropriate, a large load is applied. It is therefore assumed that an operation load of databases is reduced by periodically (for example, once a day) exchanging the foregoing message. In this case, it is possible to concentrate on entire calculation that causes a load when the period has come. Therefore, for example, implementation that causes permission for the operation to be suspended when a request to give the permission for the operation is newly received from a communication device within the period, and causes the permission for the operation to be output after periodical calculation is assumed.

FIG. 1 is an explanatory diagram illustrating an example of operating the foregoing SASs. FIG. 1 illustrates an example of the flow of operations of a secondary system for executing wireless communication secondarily using a radio wave in a predetermined frequency band, and two frequency management databases.

When the secondary system transmits a request to newly use a radio wave to a frequency management database 1 at a certain time, the frequency management database 1 returns an answer indicating suspension of the permission for the operation to the secondary system. Then, when a predetermined time has come, the frequency management database 1 exchanges a Full Activity Dump message with a frequency management database 2 and executes interference control and frequency allocation as a result of the exchange. After that, when the secondary system transmits the request to newly use the radio wave to the frequency management database 1 again, the frequency management database 1 returns an answer indicating the permission for the operation or non-permission for the operation.

However, since a user of a communication device that needs to quickly start the operation even when the communication device receives some interference needs to wait (for example, needs to wait until one day elapses) until the operation of a radio wave is permitted, the operation of the databases is inconvenient. In addition, when many communication devices are suspended, interference control calculation after the synchronization of the databases may be complex. Therefore, a specific communication device may not be suspended and the permission for the operation may be given to the specific communication device. On the other hand, in interference control, it is important that cumulative interference from a plurality of communication devices do not exceed an acceptable value of a primary system.

Figure 2:
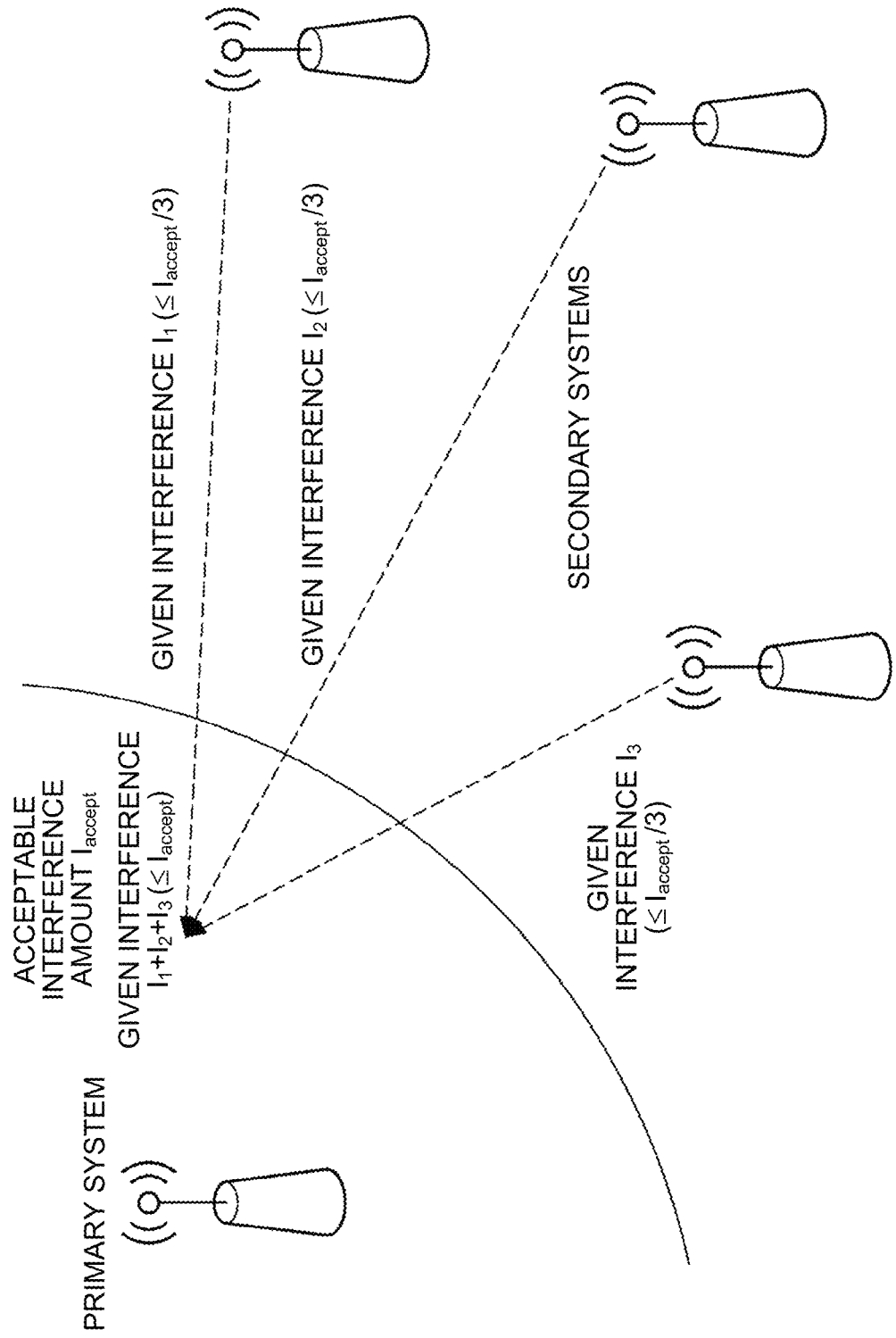
FIG. 2 is an explanatory diagram illustrating an example of allocating interference margins to secondary systems.

FIG. 2 is an explanatory diagram illustrating an example of allocating interference margins to secondary systems. Fatal interference against the primary system can be suppressed by allocating an acceptable interference amount to a plurality of secondary systems when the acceptable interference amount is given and by transmitting a radio wave based on the allocated acceptable interference amount (or a margin per system). In another example of FIG. 2, the following method is considered. The method is to allocate acceptable interference amounts so that, when an acceptable interference amount of the primary system is $I_{accept}$, and interference given by the secondary systems to the primary system is $I_1$, $I_2$, and $I_3$, the sum of $I_1$, $I_2$, and $I_3$ is equal to or smaller than $I_{accept}$. However, in this case, the interference may be excessively suppressed depending on a propagation environment or the like. Therefore, in WinnForum Requirement ("Requirements for Commercial Operation in the U.S. 3550-3700 MHz Citizens Broadband Radio Service Band", WINNF-TS-0112. https://workspace.winnforum.org/higher-logic/ws/public/docum ent?document_id=4743), a method that is referred to as iterative allocation process (IAP) is essential.

This method involves sequential calculation. Therefore, when the permission for the operation is output to a communication device within the period for the foregoing Full Activity Dump message without any consideration of the allocation of an interference margin, a calculation load equivalent to that when the device is suspended may occur after the Full Activity Dump message as a result. Therefore, a method for reducing a calculation load of the databases while quickly outputting the permission for the operation to a communication device that needs to quickly start the operation even when the communication device receives some interference is required.

In a secondary system for which interference margin allocation and transmission power have been determined, the interference margin allocation and the transmission power calculation are performed on a database again before the start of the use of a radio wave by a new secondary system. A notification indicating a change in the transmission power due to the foregoing occurs between the secondary system and the database. Therefore, to reduce the number of interactions, the following method is disclosed in, for example, U.S. Pat. No. 9,736,784. The method is to cause an extra margin to be included in an interference margin in advance, and cause the database to interact with the secondary system only when transmission power obtained by recalculation after that exceeds transmission power calculated based on the interference margin including the extra margin.

In addition, a method for detecting a change in the number of active secondary systems and modifying a margin previously calculated based on the amount of the change to reduce a calculation load of a database is disclosed in, for example, U.S. Patent Application Ser. No. 2016/0128000.

Each of the foregoing techniques uses a value corresponding to an extra margin and can be used to operate a new secondary system. However, a method for appropriately setting an extra margin is not described (the former does not describe Z and the latter does not describe a method for setting a change in the number of virtual white space devices (WSDs)). When the actual operation is assumed, it is considered to be desirable to appropriately set an extra margin from the perspective of the foregoing points.

Therefore, the present discloser has diligently studied a technique that is able to cause a secondary system to flexibly operate a radio wave while reducing a recalculation load of interference control that may occur due to a change in an operation state of a wireless system within a time interval between periodical exchanges of information between databases from the perspective of the foregoing points. As a result, the present discloser has devised the technique that is able to cause a secondary system to flexibly operate a radio wave while reducing a recalculation load of interference control that may occur due to a change in an operation state of a wireless system within a time interval between periodical exchanges of information between databases, as described below.

1.2. Overview

Figure 3:
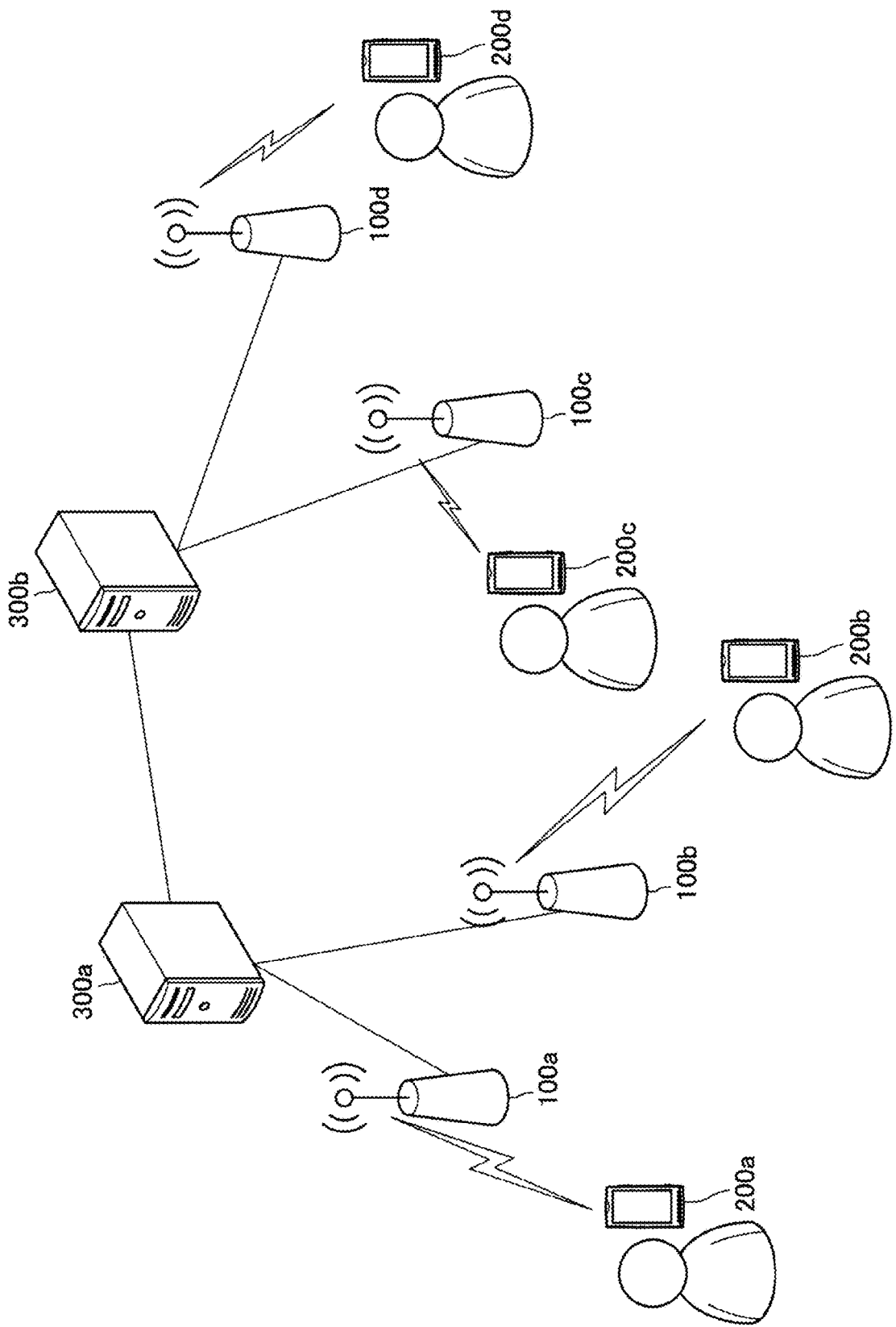
FIG. 3 is an explanatory diagram illustrating an example of a configuration of a wireless system according to an embodiment of the present disclosure.

First, an example of a configuration of a wireless system according to the embodiment of the disclosure is described. FIG. 3 is an explanatory diagram illustrating the example of the configuration of the wireless system according to the embodiment of the disclosure. FIG. 3 illustrates wireless devices 100a to 100d, terminals 200a to 200d, and communication control devices 300a and 300b. The terminals 200a to 200d wirelessly communicate with the wireless devices 100a to 100d, respectively. The communication control devices 300a and 300b control base stations.

The wireless devices 100a to 100d are typically devices corresponding to wireless base stations, access points, or wireless relay stations. The wireless devices 100a to 100d may be fixed or may be installed in moving objects such as vehicles. A wireless access technique to be used by the wireless devices 100a to 100d is not limited to a specific technique. In addition, sizes of coverage of the wireless devices 100a to 100d may be large, like macrocells, or may be small, like picocells. Furthermore, when the wireless devices 100a to 100d have an ability of beam forming, a cell or a service area may be formed for each of beams. Typically, one wireless device is installed and operated by one business operator or one individual, but the present disclosure is not limited to this. The wireless devices 100a to 100d may be shared equipment to be used by a plurality of business operators or a plurality of individuals. In this case, the wireless devices 100a to 100d may be installed and operated by a third party different from users.

The terminals 200a to 200d are typically communication devices such as smartphones. The terminals 200a to 200d may not be used by persons. For example, the terminals 200a to 200d may be devices such as sensors installed in machines of a factory or in a building and connected to a network. In addition, each of the terminals 200a to 200d may have a relay communication function, as typified by Device to Device (D2D). Furthermore, the terminals 200a to 200d may be equipment referred to as client premises equipment (CPE) to be used for wireless backhaul or the like.

The communication control devices 300a and 300b are devices that determine and instruct operation parameters of the wireless devices 100a to 100d. For example, the communication control devices 300a and 300b may be network managers for executing integrated control on the wireless devices within the network or may be control devices such as spectrum managers/coexistence managers for executing radio interference control between the wireless devices, as typified by ESTI EN 303 387 and IEEE 802.19.1-2014. In a spectrum access environment, database servers such as a geolocation database (GLDB) and a spectrum access system (SAS) may be included in the communication control devices 300a and 300b. The number of communication control devices may be one in one system. However, when the communication control devices 300a and 300b exist as illustrated in FIG. 3, the communication control devices 300a and 300b exchange information of the wireless devices managed with each other and execute necessary frequency allocation and interference control calculation. Basically, targets to be controlled by the communication control devices 300a and 300b are the wireless devices 100a to 100d, but the communication control devices 300a and 300b may control the terminals 200a to 200d with which the wireless devices 100a to 100d wirelessly communicate.

In the present embodiment, a description is provided while assuming the spectrum access environment. As an example, according to Citizens Broadband Radio Service (CBRS) legislated by the U.S. Federal Communications Commission (FCC), as illustrated in a diagram described below, a primary system serves as military radar, a grandfathered wireless system, and a fixed satellite service (radio transmission from the space to the earth), and secondary systems serve as wireless systems that are referred to as Citizens Broadband Radio Service devices (CBSDs). The secondary systems have priorities. A priority access license (PAL) to use a shared band, and general authorized access (GAA) equivalent to no license required are defined. In the embodiment of the present disclosure, the wireless systems are not limited to this. Another wireless system may be the primary system. In addition, the environment may be a spectrum access environment with another frequency band. Furthermore, the present disclosure is not limited to the spectrum access. The techniques disclosed herein may be used to a scenario of network coexistence between the same or different wireless systems using the same frequency.

Figure 4:
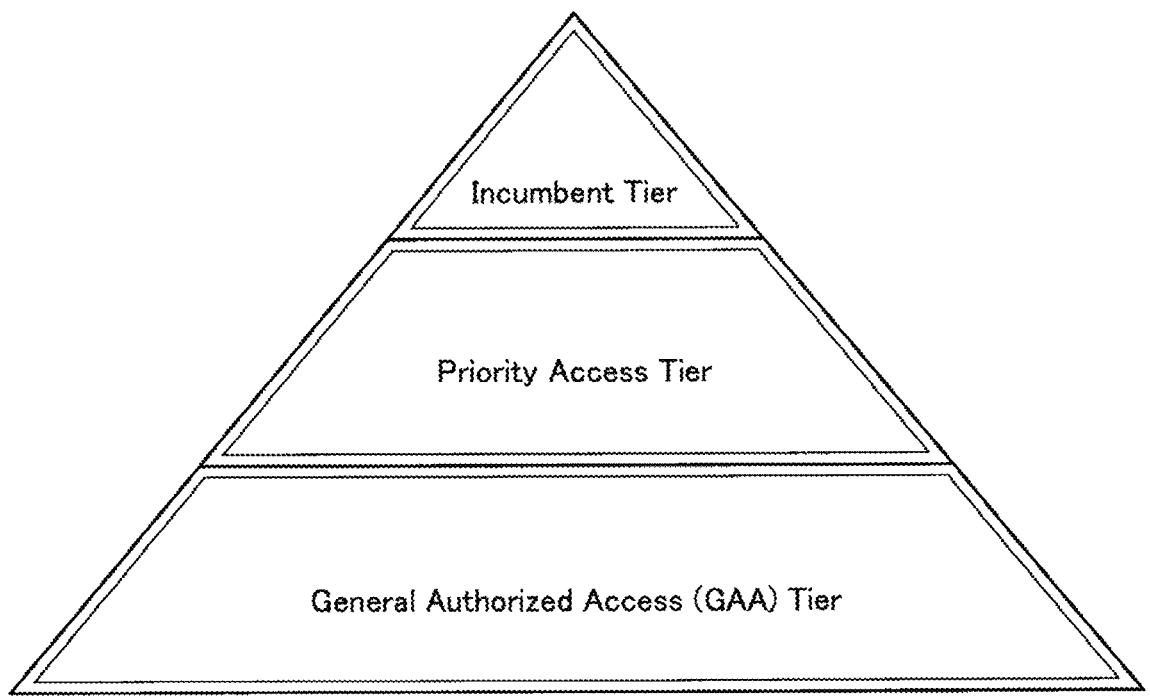
FIG. 4 is an explanatory diagram illustrating a tiered structure using CBRS.
Figure 5:
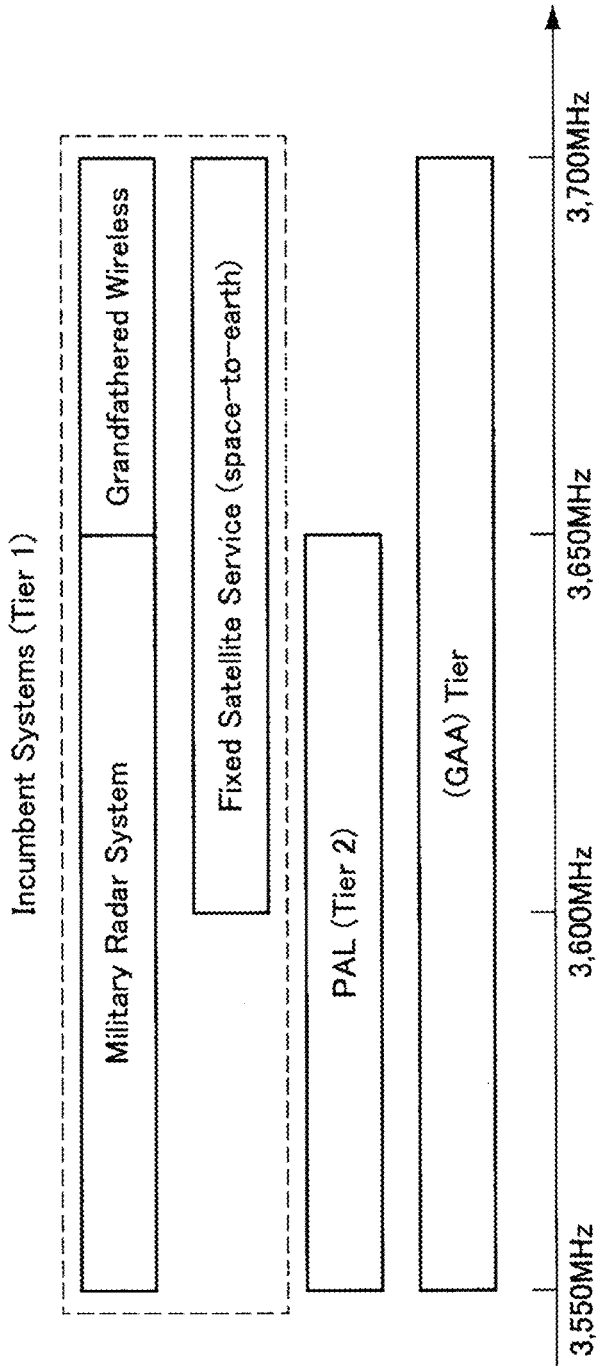
FIG. 5 is an explanatory diagram illustrating CBRS bands.

FIG. 4 is an explanatory diagram illustrating a tiered structure using CBRS. A wired access tier at a higher level than a general authorized access tier, and an incumbent tier at a higher level than the wired access tier exist. FIG. 5 is an explanatory diagram illustrating CBRS bands. The embodiment assumes that bands for the general authorized access tier, the wired access tier, and the incumbent tier are defined as illustrated in FIG. 5.

Figure 6:
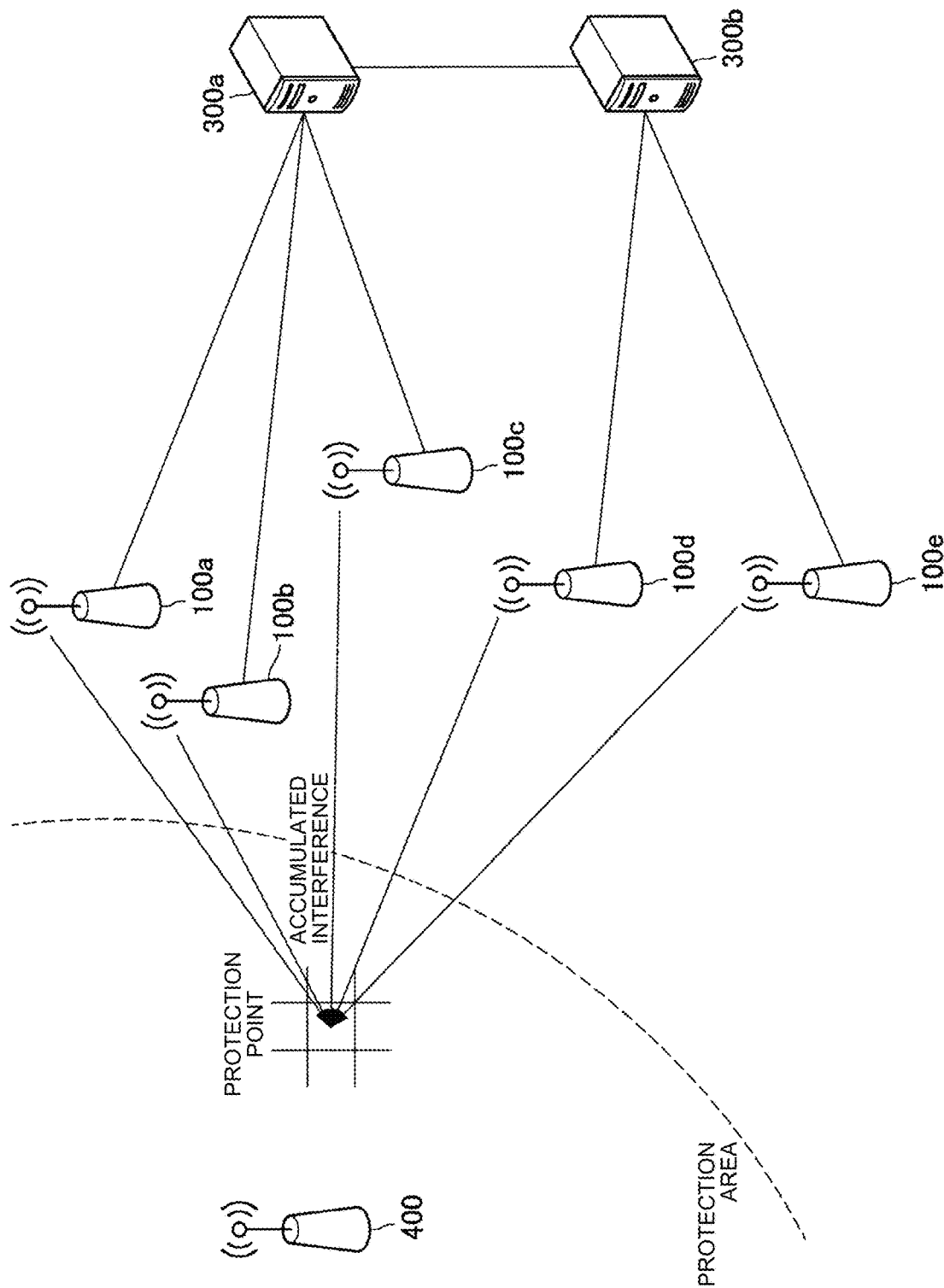
FIG. 6 is an explanatory diagram illustrating an example of an interference model assumed in the embodiment.
Figure 7:
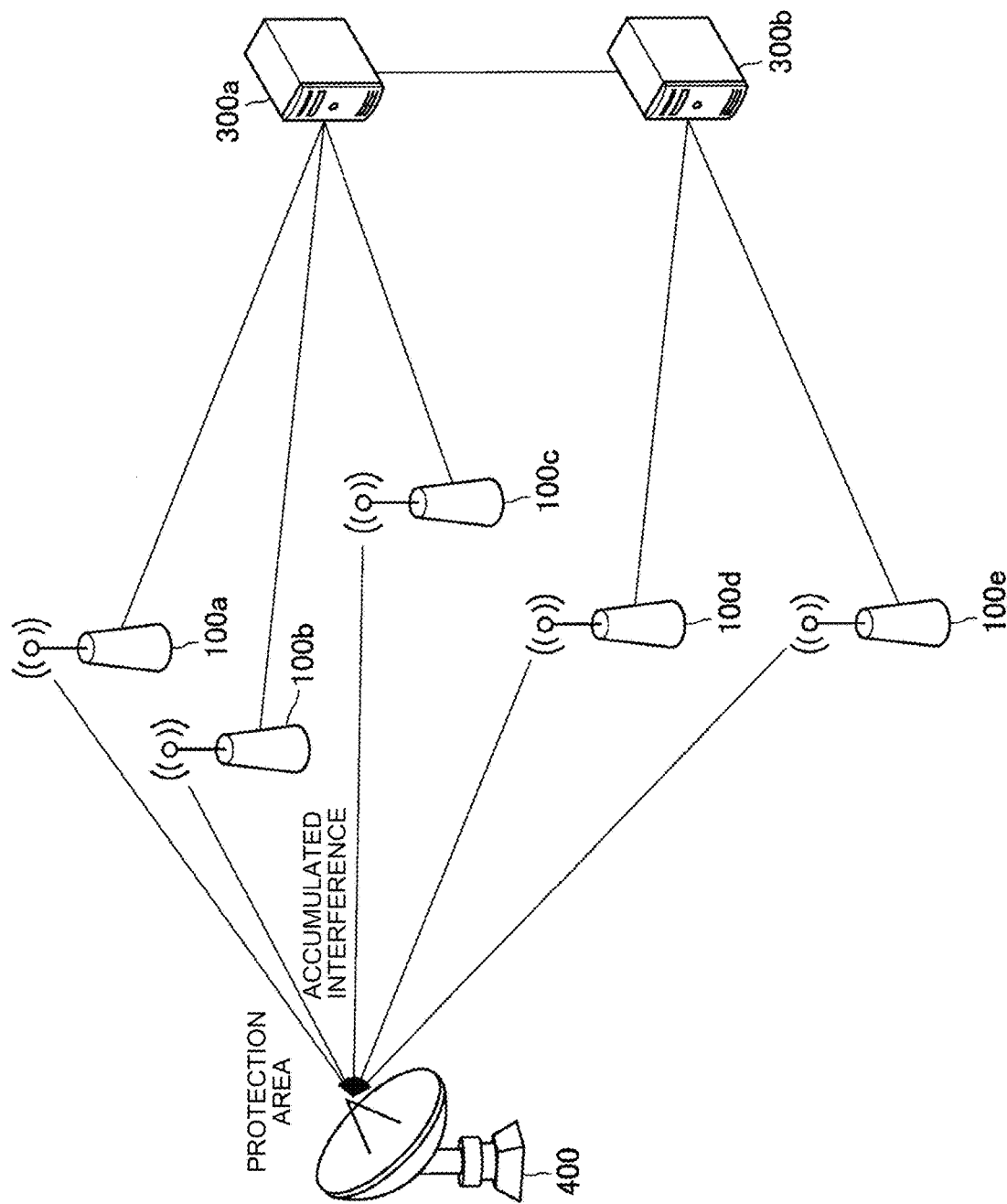
FIG. 7 is an explanatory diagram illustrating an example of the interference model assumed in the embodiment.

Next, examples of an interference model are described. FIGS. 6 and 7 are explanatory diagrams illustrating the examples of the interference model assumed in the embodiment. FIG. 6 is an explanatory diagram illustrating interference given by wireless devices 100a to 100e to a protection point within a protection area of a primary system 400. The example of FIG. 6 indicates an interference model used for a system that has a service area and is grandfathered wireless or the like. In the interference model, amounts of interference at a plurality of protection points set in the protection area are considered. FIG. 7 illustrates an interference model used for a system with a primary system such as a satellite earth station for only executing reception. In the interference model, for example, the amount of interference at a point as a protection point that is the position of a receiving antenna of the satellite earth station is considered.

Subsequently, a typical interference control method is described. The typical interference control method in the communication system illustrated in FIG. 7 is described.

It is assumed that an acceptable interference threshold of the primary system is $I_{accept}$. This threshold may be an actual threshold or a value set based on a certain margin (for example, a protection ratio) from the actual threshold in consideration of an error and fluctuations.

The interference control determines transmission power (EIRP, conducted power+antenna gains, and the like) of the wireless devices so that interference power does not exceed this acceptable interference threshold $I_{accept}$. When many wireless devices exist and the interference control is executed so that interference power of each of the wireless devices does not exceed the acceptable interference threshold, interference power received by the primary system may exceed the acceptable interference threshold. Therefore, acceptable interference amounts are typically allocated based on the numbers of wireless devices registered in the communication control devices.

Figure 8:
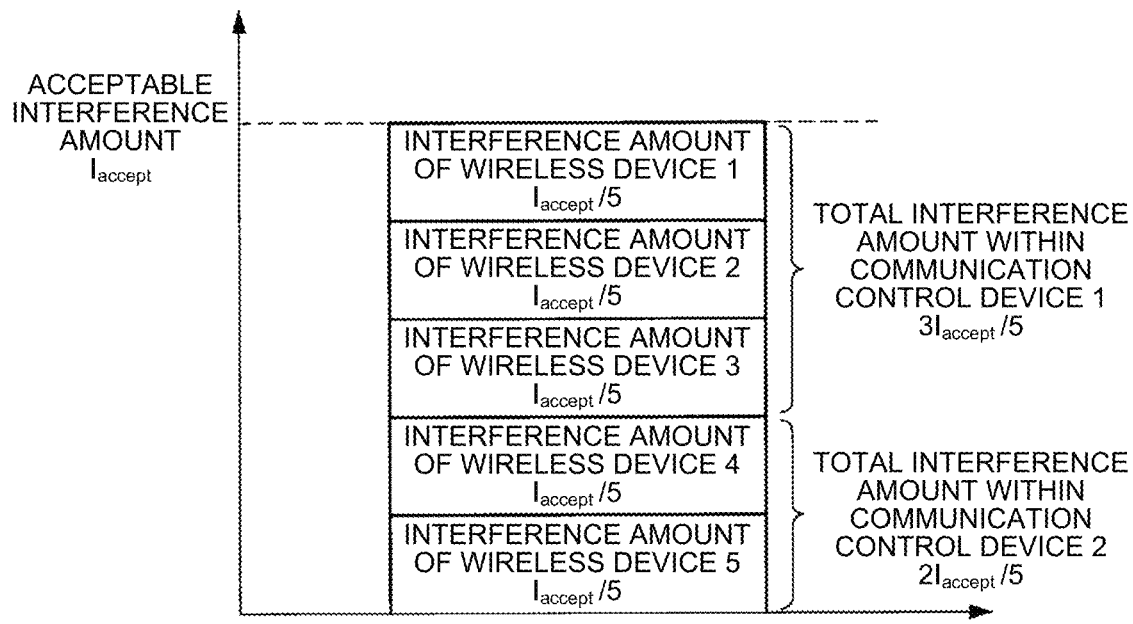
FIG. 8 is an explanatory diagram illustrating an example of allocating acceptable interference amounts.

For example, in FIG. 7, the total number of wireless devices is 5. Therefore, an acceptable interference amount $I_{accept}/5$ is allocated to each of the wireless devices. Since the wireless devices cannot recognize the allocated amounts by themselves, the wireless devices recognize the allocated amounts via the communication control devices or acquire transmission power determined based on the allocated amounts. Each of the communication control devices cannot recognize the number of wireless devices managed by the other communication control device. Therefore, the communication control devices can recognize the total number of wireless devices by exchanging information with each other and can allocate the acceptable interference amounts. FIG. 8 is an explanatory diagram illustrating an example of allocating the acceptable interference amounts. For example, in the model illustrated in FIG. 7, an acceptable interference amount $3 \times I_{accept}/5$ is allocated to the communication control device 300a as illustrated in FIG. 8.

In this typical interference control method, a problem occurs when a secondary system newly starts the operation. For example, it is assumed that a wireless device that is the fourth secondary system and belongs to the communication control device 300a appears. In this case, since all interference margins of the communication control device 300a are already allocated to the existing three wireless devices 100a to 100c, an interference margin cannot be allocated to the new secondary system. A method for reducing the acceptable interference amounts allocated to the existing three wireless devices 100a to 100c and securing an acceptable interference amount for the new wireless device is considered. However, the recalculation of the margins, the suspension of radio waves, and the like may reduce throughput. In addition, since the total number of all secondary systems changes, the wireless devices managed by the other communication control device 300*b* are also affected.

The embodiment provides a method for appropriately enabling the operation even in a state in which a secondary system newly starts the operation.

Figure 9:
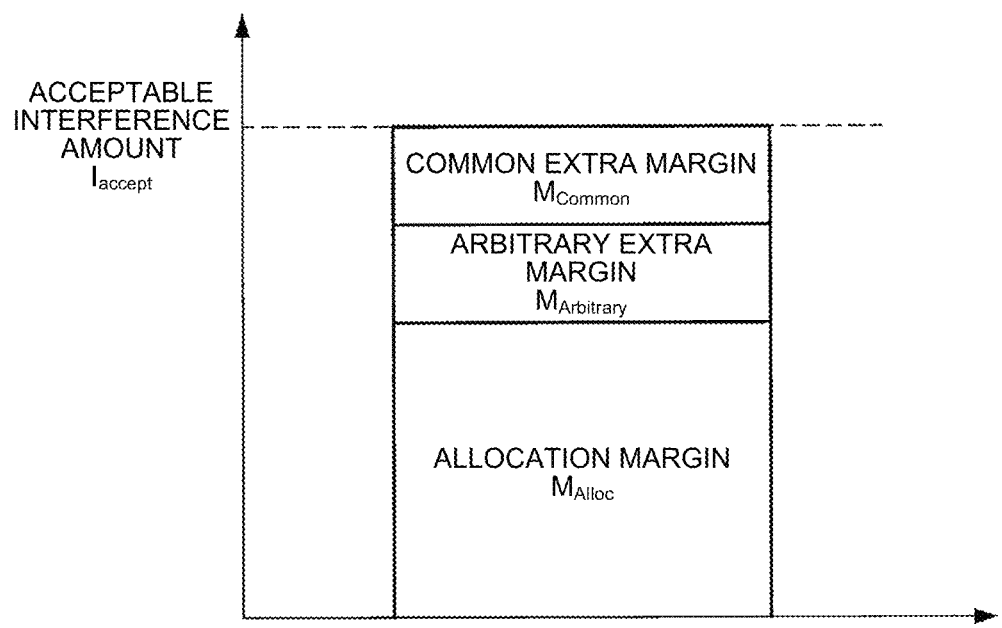
FIG. 9 is an explanatory diagram illustrating a concept of the design of margins according to the embodiment.

FIG. 9 is an explanatory diagram illustrating a concept of the design of margins according to the embodiment. In the embodiment, three margins, an allocation margin, an arbitrary extra margin, and a common extra margin are set.

The allocation margin is a margin to be allocated to a secondary system that is currently operating. The arbitrary extra margin is a margin that can be arbitrarily set by one communication control device. The arbitrary extra margin is provided to absorb a change in a margin that may occur due to a change in the total number of secondary systems within one communication control device. The common extra margin is a margin value to be commonly set between different communication control devices. As described above, the common extra margin is provided to absorb a change in a margin that may occur due to a change in the total number of all secondary systems managed across the communication control devices.

Figure 10:
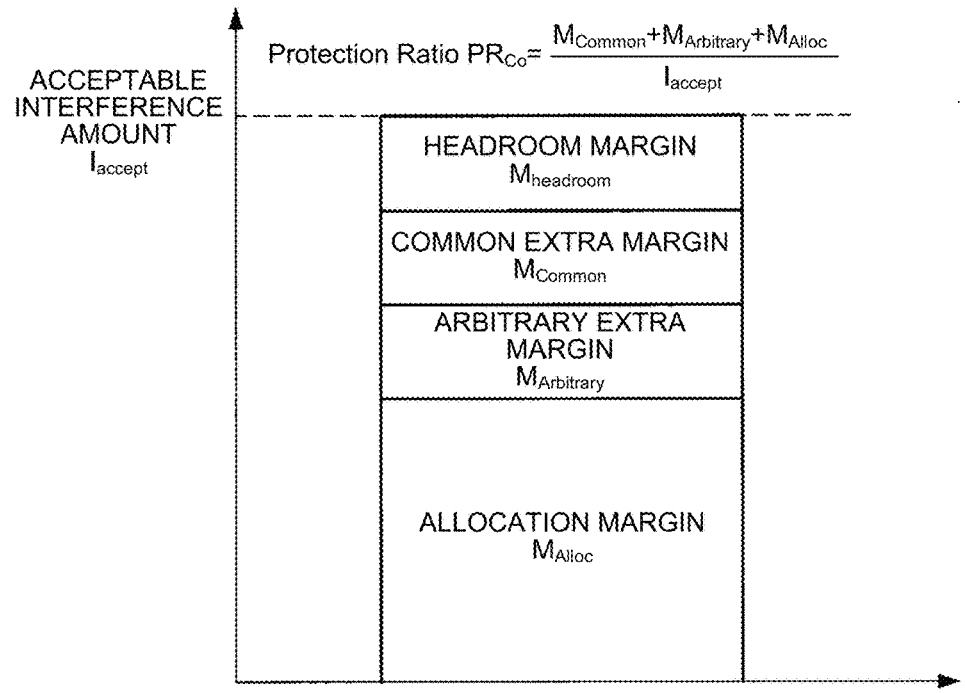
FIG. 10 is an explanatory diagram illustrating a concept of the design of margins according to the embodiment.

It is assumed that these margins and the acceptable interference amounts are considered as one set. Therefore, the margins may be set for each frequency channel. In addition, as illustrated in FIG. 10, the margins may be designed in consideration of a protection ratio. The protection ratio $PR_{Co}$ is represented by (the common extra margin+the arbitrary extra margin+the allocation margin)/an acceptable interference amount. When the protection ratio is set in advance, the sum of the allocation margin, the arbitrary extra margin, and the common extra margin is calculated from the acceptable interference amount and the value of the protection ratio.

The following description focuses on one frequency channel and omits a description of a headroom margin illustrated in FIG. 10 for simplicity. Therefore, in the embodiment, in equations and the like used in the following description, items obtained in consideration of a plurality of channels and the headroom margin may be introduced and used.

(Method for Setting Margin, Allocation Margin)

The allocation margin is a margin to be allocated to a plurality of wireless systems managed by a communication control device for the purpose of avoiding fatal interference against a wireless system to be protected. Methods for setting the allocation margin are disclosed in various documents and thus will not be described in detail. For example, ECC Report 186 discloses the setting methods that are the fixed margin, the flexible margin, and the flexible minimized margin. In addition, for example, the WinnForum Requirement document discloses the method that is the iterative allocation process (IAP). Although an amount to be allocated as an allocation margin is basically set based on the number of wireless systems to be protected in each of these methods, the present disclosure does not need to be limited to this.

For example, when indices such as priorities are set between wireless systems, weights based on the priorities may be multiplied by amounts of margins to be allocated. In this case, the total amount of the allocation margins can be calculated according to the following Equation 1 based on FIG. 9.

$$M_{Alloc} = I_{Accept} - M_{Common} - M_{Arbitrary} \quad (1)$$

Therefore, regardless of which setting method is used, it is said that it is necessary to set the common extra margin and the arbitrary extra margin. These setting methods are described below.

(Method for Setting Margin, Common Extra Margin)

The common extra margin is a margin value to be commonly set between the different communication devices. As described above, the common extra margin is provided to absorb a change in an interference margin to be allocated to each wireless system. The change in the interference may occur due to a change in the total number of all wireless systems managed across the communication control devices.

Figure 11:
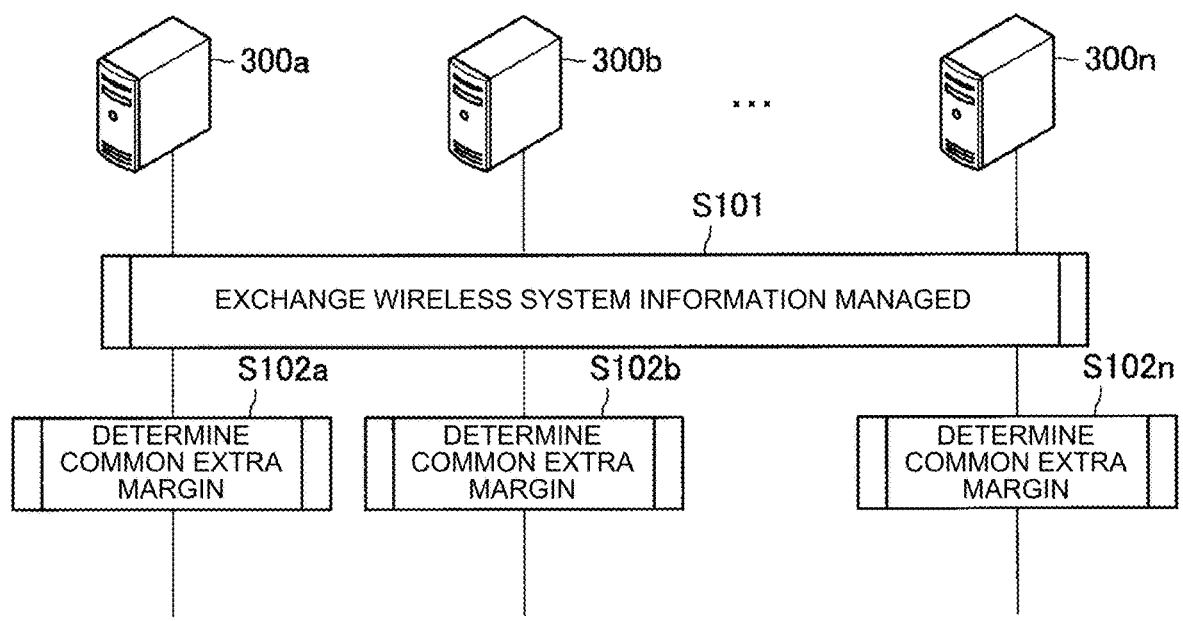
FIG. 11 is a flow diagram illustrating an example of setting a common extra margin according to the embodiment.

FIG. 11 is a flow diagram illustrating an example of setting the common extra margin according to the embodiment. FIG. 11 illustrates an example of operations of a number N of communication control devices 300*a*, 300*b*, . . . , and 300*n*.

Each of the communication control devices exchanges wireless system information managed by the communication control device at an arbitrary time (step S101). At step S101, for example, Full Activity Dump messages are exchanged. As described above, each of the Full Activity Dump messages includes a CBSD Data record, a Zone Data record, and an ESC Sensor record. The CBSD Data record includes base station installation position information and operation parameters (frequency, transmission power). The Zone Data record includes a PAL protection area (PPA, a protection region of a secondary use system with a high priority). The ESC Sensor record includes installation position information of a sensor for detecting a military radar signal.

Then, each of the communication control devices sets the common extra margin based on the wireless system information (step S102). Details of the setting of the common extra margin are described later.

Figure 12:
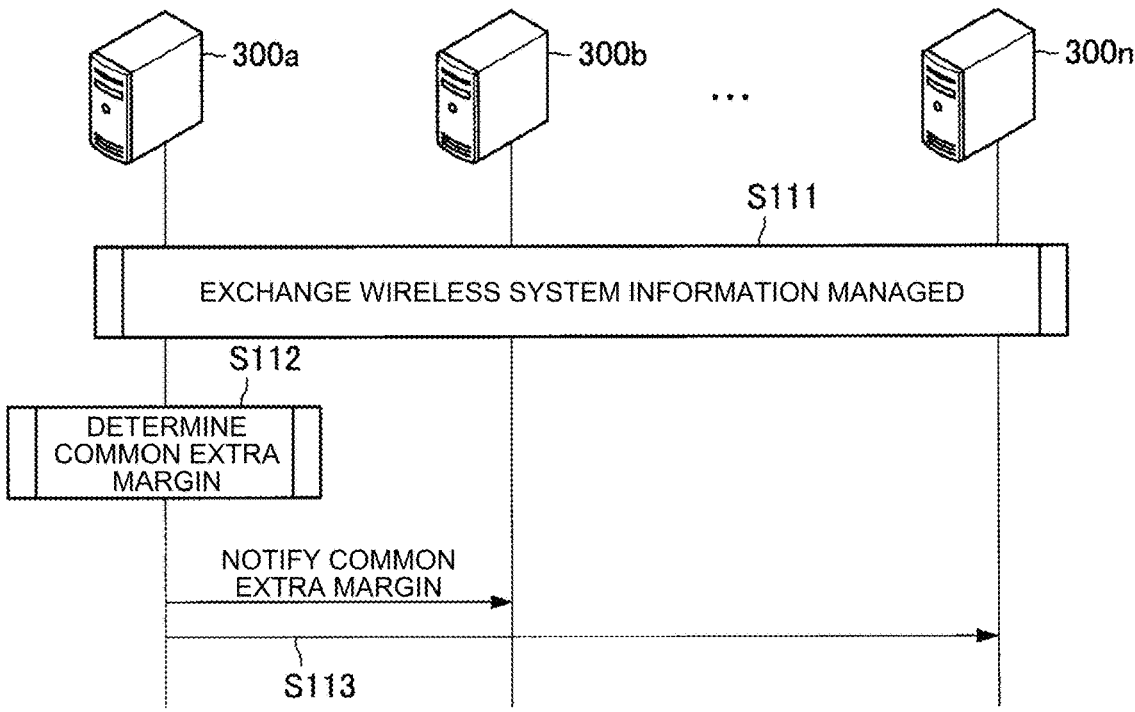
FIG. 12 is a flow diagram illustrating an example of setting the common extra margin according to the embodiment.

In the setting example illustrated in FIG. 11, all the communication control devices set the common extra margin. However, one of the communication control devices may set the common extra margin, and the other communication control devices may acquire information of the setting of the common extra margin from the communication control device that has set the common extra margin. FIG. 12 is a flow diagram illustrating an example of setting the common extra margin according to the embodiment. FIG. 12 illustrates an example of operations of the number N of communication control devices 300*a*, 300*b*, . . . , and 300*n*.

Each of the communication control devices exchanges wireless system information managed by the communication control device at an arbitrary time (step S111). Subsequently, the communication control device 300*a* sets the common extra margin based on the wireless system information (step S112). Then, the communication control device 300*a* notifies the set common extra margin to the other communication control devices 300*b* to 300*n* (step S113).

Figure 13:
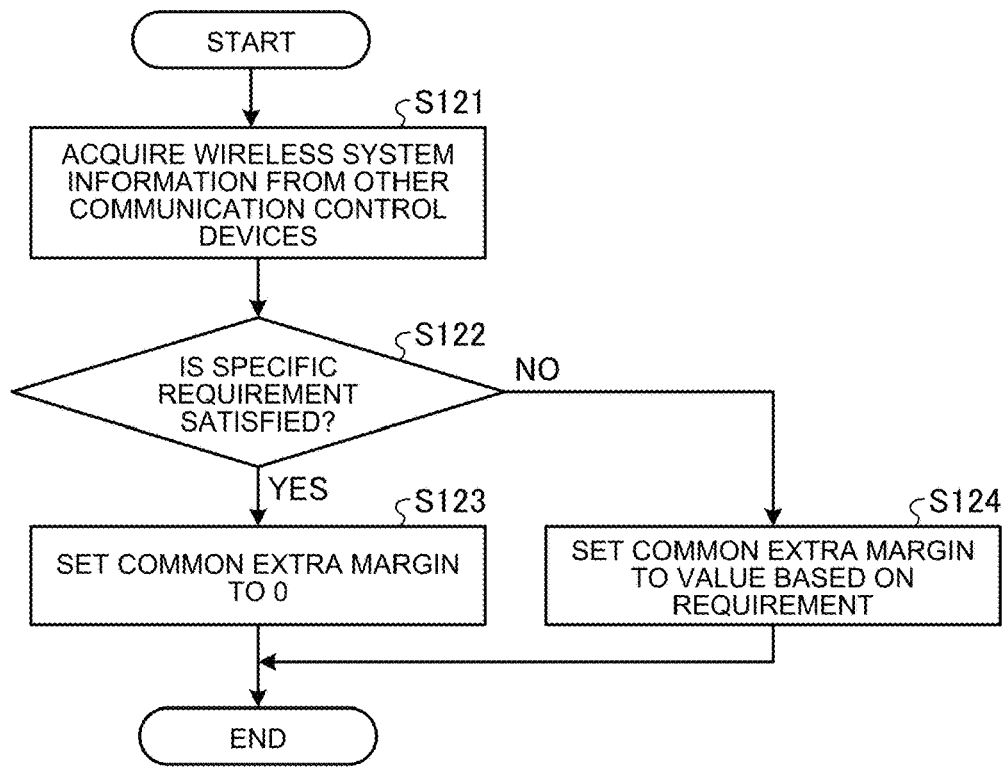
FIG. 13 is a flow diagram illustrating an example of an operation of a communication control device according to the embodiment.

The common extra margin may be set to 0 in some cases. FIG. 13 is a flow diagram illustrating an example of an operation of the communication control device according to the embodiment. FIG. 13 illustrates the example of the operation of the communication control device for the setting of the common extra margin.

For example, the communication control device 300*a* acquires the wireless system information from the other communication control devices (step S121) and uses the wireless system information of the communication control device 300*a* and the acquired wireless system information to determine whether a specific requirement is satisfied (step S122). When the specific requirement is satisfied (Yes at step S122), the communication control device 300a sets the common extra margin to 0 (step S123). When the specific requirement is not satisfied (No at step S122), the communication control device 300a sets the common extra margin to a value based on the requirement (step S124).

An example of the requirement for setting the common extra margin to 0 is described. The communication control device 300a determines whether to set the common extra margin to 0, based on position information of the wireless system to be protected and position information of the wireless systems managed. For example, when positional relations between the wireless system to be protected and the wireless systems managed satisfy the specific requirement, the communication control device 300a sets the common extra margin to 0.

In addition, when it is determined that the wireless systems managed by all the other communication devices are sufficiently far away from the wireless system to be protected and are not subjected to interference calculation, the communication control device 300a sets the common extra margin to 0.

Figure 14:
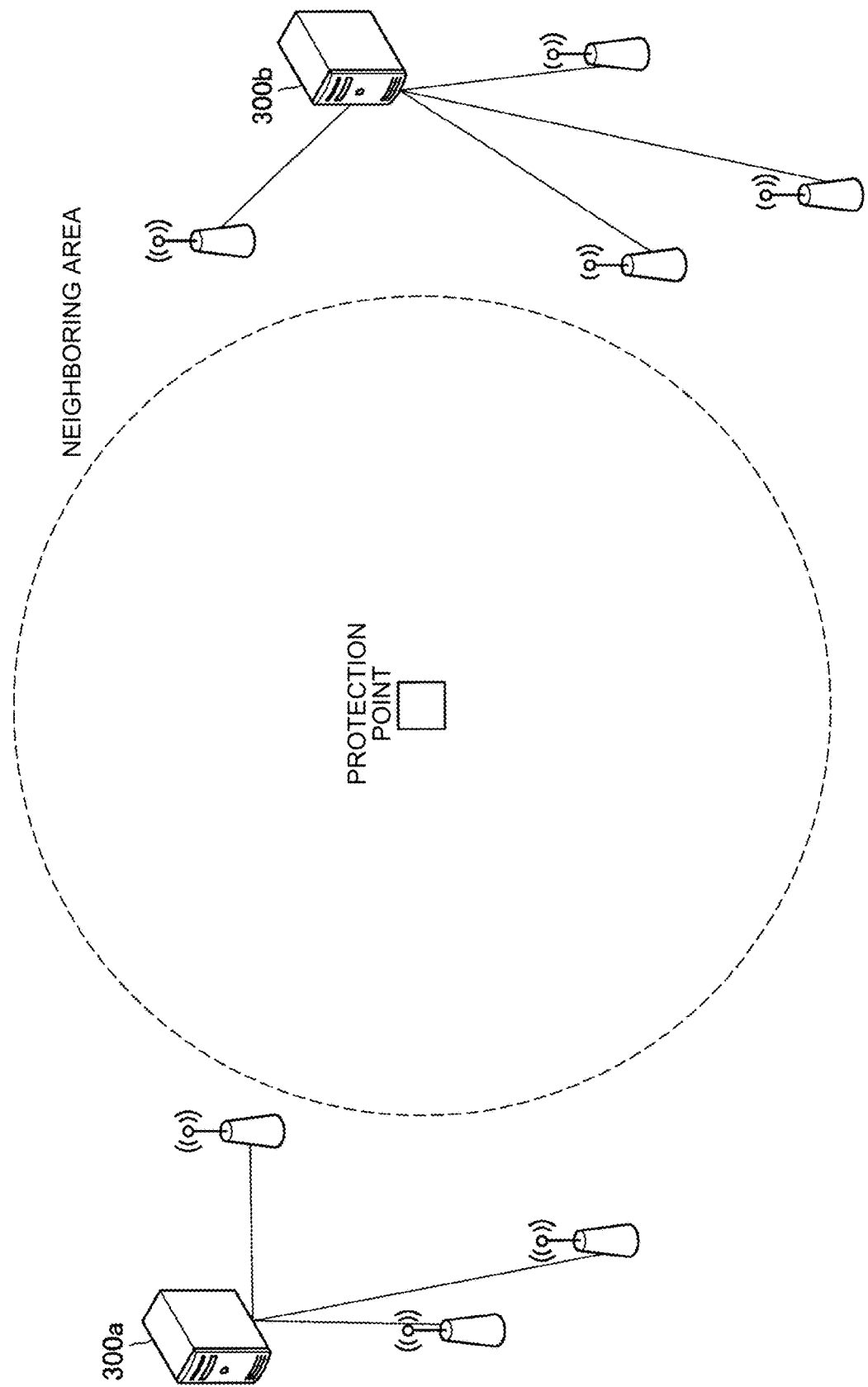
FIG. 14 is an explanatory diagram illustrating an example of the arrangement of wireless systems.
Figure 15:
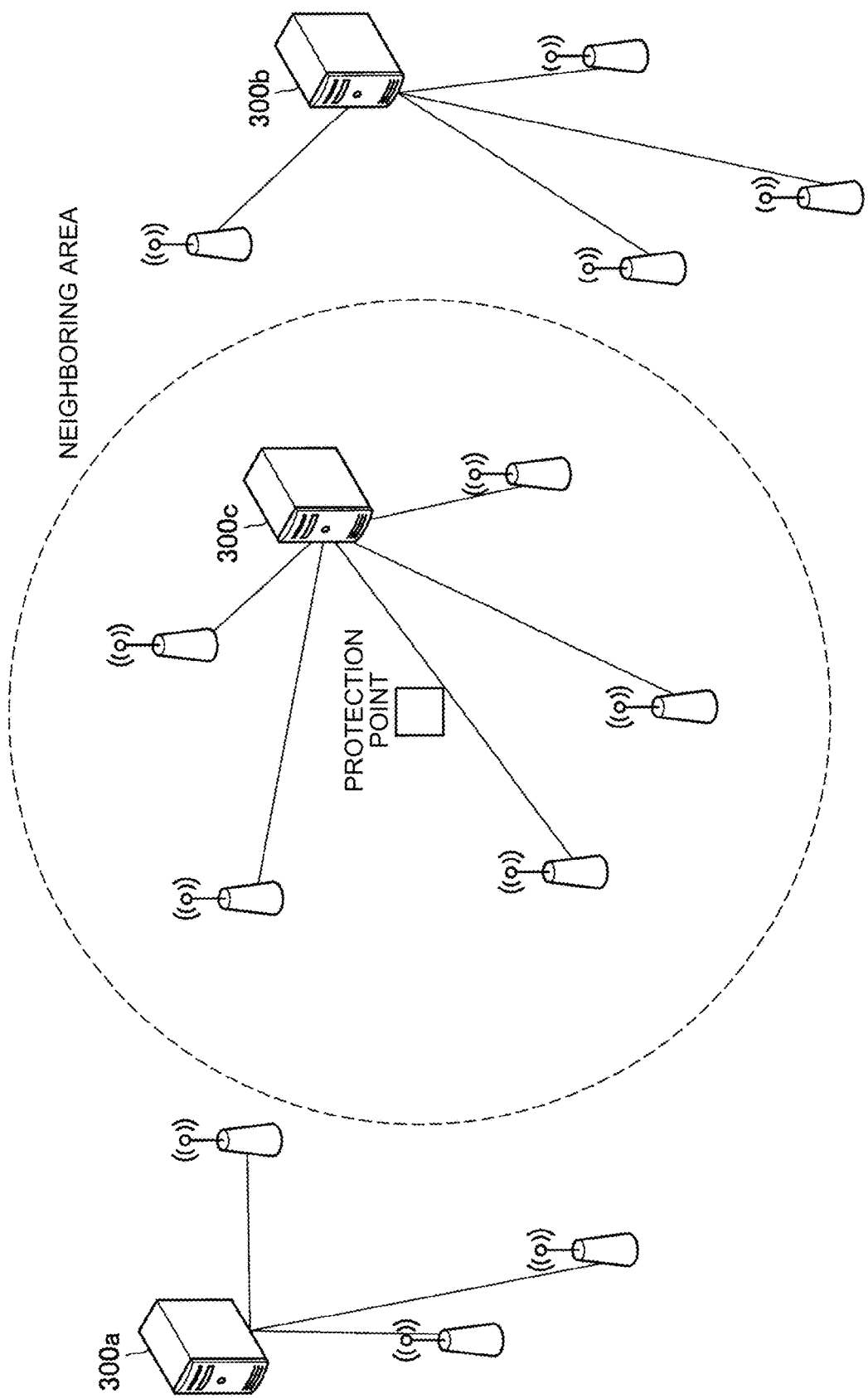
FIG. 15 is an explanatory diagram illustrating an example of the arrangement of wireless systems.

FIGS. 14 and 15 are explanatory diagrams illustrating examples of the arrangement of the wireless systems. FIG. 14 illustrates an example in which a neighboring area surrounding a protection point is set and in which wireless systems managed by the communication control devices 300a and 300b are operated inside and outside the area. This case assumes that all the wireless systems are operated with the same frequency channel as the primary system located at the protection point for simplicity. In addition, it is assumed that these wireless systems are managed and controlled by the communication control devices 300a and 300b. In this case, determination criteria for determining only a wireless system existing in the neighboring area of the protection point as an interfering system may be provided.

In this case, as illustrated in FIG. 14, when any of the wireless systems does not exist in the neighboring area of the protection point, each of the communication control devices 300a and 300b may set the common extra margin to 0. Similarly, as illustrated in FIG. 15, when only wireless systems managed and controlled by the communication control device 300c exist in the neighboring area, the common extra margin may be set to 0 in each of the communication control devices 300a, 300b, and 300c.

Next, an example of a requirement for setting the common extra margin to a value other than 0 is described. For example, positional relations between the wireless system to be protected and the wireless systems managed do not satisfy the specific requirement, the communication control devices 300a sets the common extra margin to a value based on the requirement.

Figure 16:
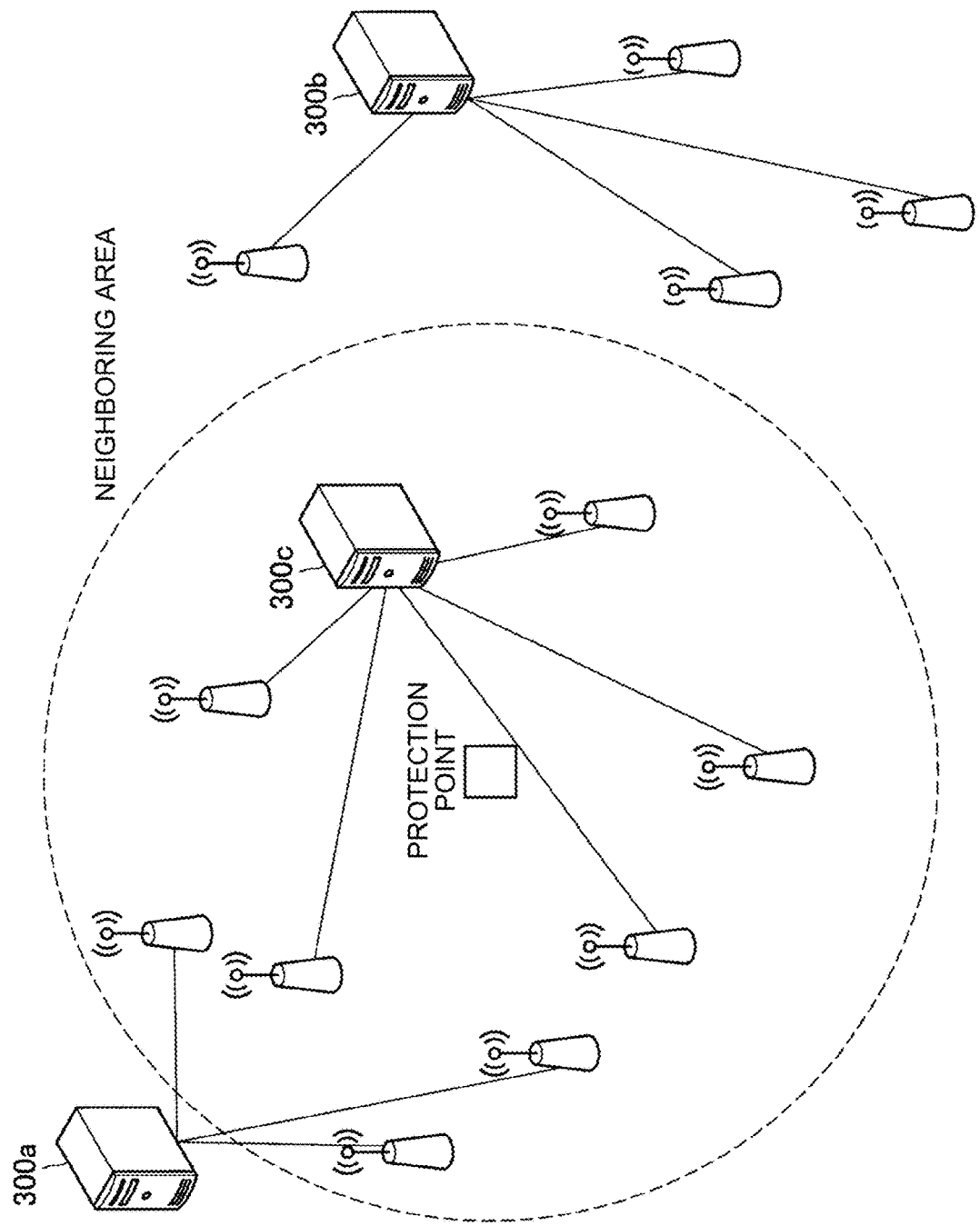
FIG. 16 is an explanatory diagram illustrating an example of the arrangement of wireless systems.

FIG. 16 is an explanatory diagram illustrating an example of the arrangement of the wireless systems. FIG. 16 illustrates the case where the wireless systems managed by the communication control devices 300a and 300c exist in the neighboring area of the wireless system to be protected. In this case, the common extra margin may be set in the communication control devices 300a, 300b, and 300c. In the example of FIG. 16, for example, a description may be made as follows.

The communication control device 300a: $M_{Common} = M_{Common1}$

The communication control device 300c: $M_{Common} = M_{Common2}$

The communication control device 300d: $M_{Common} = M_{Common3} = 0$

An example of specific values of common extra margins $M_{Common1}$ and $M_{Common2}$ is described below. It may be assumed that information of the wireless systems managed is exchanged between the communication control devices regardless of whether an allocated channel exists.

For example, it is assumed that a wireless system that is among the wireless systems managed by the communication control device 300a and has an allocated channel is $N_{1,Node,Assigned}$, a wireless system that is among the wireless systems managed by the communication control device 300a and does not have an allocated channel is $N_{1,Node,NotAssigned}$, a wireless system that is among the wireless systems managed by the communication control device 300c and has an allocated channel is $N_{2,Node,Assigned}$, a wireless system that is among the wireless systems managed by the communication control device 300c and does not have an allocated channel is $N_{2,Node,NotAssigned}$. In this case, the common extra margin can be set according to the following Equation (2) while it is assumed that channels are newly allocated to the wireless systems $N_{1,Node,Assigned} + N_{2,Node,Assigned}$.

$$M_{Common1} = M_{Common2} = \frac{N_{1,Node,NotAssigned} + N_{2,Node,NotAssigned}}{N_{1,Node,Assigned} + N_{1,Node,NotAssigned} + N_{2,Node,Assigned} + N_{2,Node,NotAssigned}} \quad (2)$$

It is assumed that the foregoing common extra margin is set at a time t1 and that all the wireless system information is exchanged again at a time t2. In this case, when the following equation is satisfied, it is not necessary to update the common extra margin at the time t2.

$$(N_{1,Node,Assigned}(t_2) + N_{2,Node,Assigned}(t_2)) - (N_{1,Node,Assigned}(t_1) + N_{2,Node,Assigned}(t_1)) < N_{1,Node,NotAssigned}(t_1) + N_{1,Node,NotAssigned}(t_1) \quad (3)$$

When the communication control devices do not satisfy the foregoing Equation (3), the communication control devices may reset the common extra margin.

In the embodiment, "wireless systems that do not have an allocated channel" may include a wireless system that has an allocated channel but does not have initial permission for radio transmission from a communication control device.

In addition, a number counted may be weighted. For example, a coefficient may be given to each of the wireless systems based on a distance from the primary system to be protected and the sum of the coefficients may be used as a real number in the foregoing equation. In addition, for example, coefficients in a range of 0 to 1 may be given to wireless systems of a low output class based on output classes of the wireless systems, and the sum of the coefficients may be used as a real number in the foregoing equation.

In the wireless systems, time division duplex (TDD) may be used for wireless interfaces of the wireless systems. In this case, any of an uplink and a downlink is executed for each time slot.

In the embodiment, in an exchange of information between the communication control devices, wireless method information on TDD configurations of the wireless systems may be exchanged and the number may be counted based on the wireless method information. The wireless method information may include, for example, information indicating an access technique and information indicating an access method. The information indicating the access technique may include an identifier indicating LTE, WI-FI, 5G NR (NEW RADIO), or the like and a release number. When TDD is used, the information indicating the access method may include TDD configuration information, available TDD configuration information, and information of a time as a standard for synchronization between base stations. When Full Duplex or Listen Before Talk (LBT) is used, the information indicating the access method may include category information (four categories are defined in the 3GPP) and available category information.

The description of the invention does not assume that frequency division duplex (FDD) is used for communication between the wireless devices and the terminals. This is due to the fact that, since frequencies in an uplink and a downlink are different, a possibility that a wireless device and a terminal simultaneously emit radio waves is very low. In the present disclosure, however, FDD does not necessarily need to be excluded and may be considered when an FDD uplink frequency of a specific terminal is the same as an FDD downlink frequency of a specific wireless device or when adjacent-channel interference may be given to a system to be protected.

The following description focuses on TDD indicated in the access method information. Another method is applicable using the same method.

Figure 17:
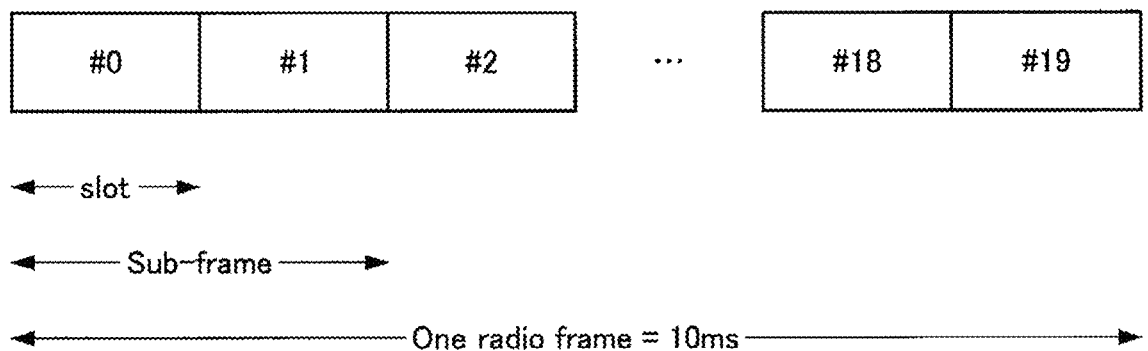
FIG. 17 is an explanatory diagram illustrating an example of the configuration of a frame.
Figure 18:
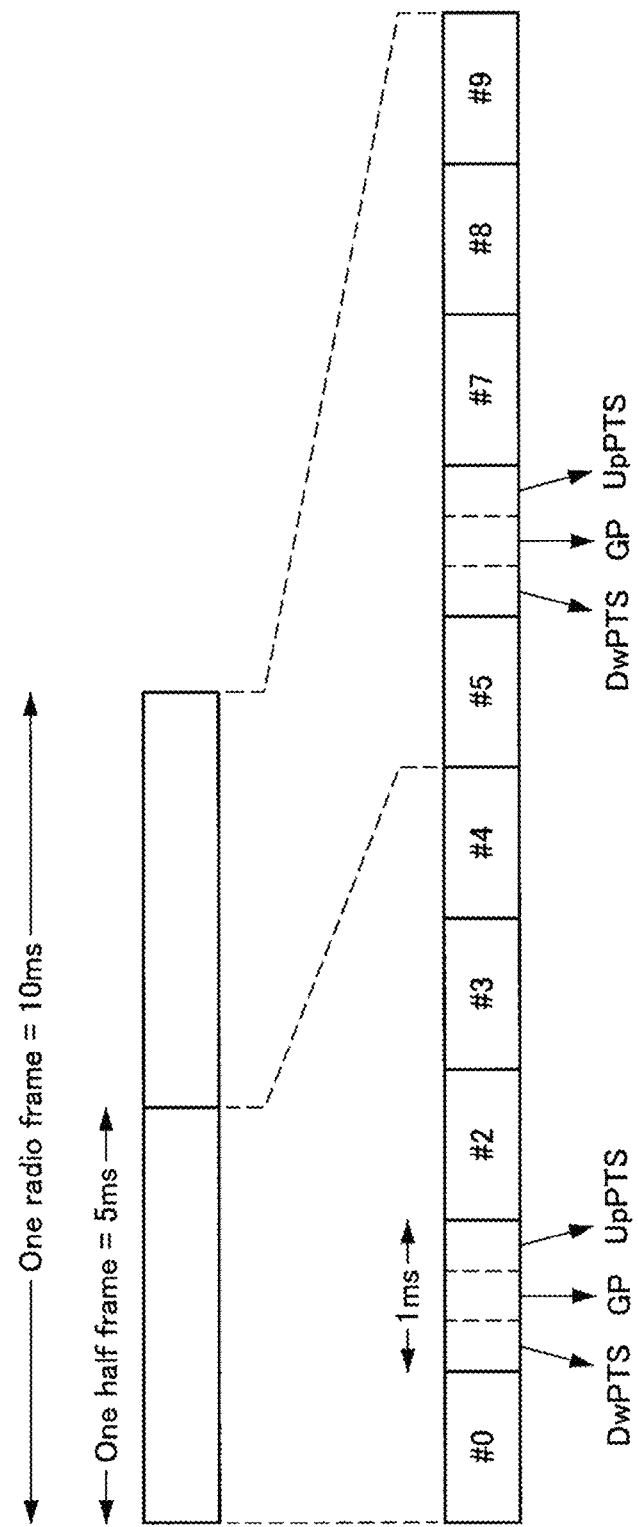
FIG. 18 is an explanatory diagram illustrating an example of the configuration of a frame.

In LTE, two types of frame configurations are supported. In TDD, combinations of the uplink and the downlink are defined and base stations are operated in accordance with any of the combinations. FIG. 17 is an explanatory diagram illustrating an example of the configuration of a frame used for, for example, FDD. As illustrated in FIG. 17, one frame has a time length of 10 milliseconds and is composed of 10 sub-frames, and each of the sub-frames is composed of 2 slots. FIG. 18 is an explanatory diagram illustrating an example of the configuration of a frame used for, for example, TDD. A table 1 is an explanatory diagram indicating settings of the allocation of the uplink and the downlink in TDD.

TABLE 1

(Table 1: Allocation of uplink and downlink)

| Config-uration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For example, since interference by a wireless system occurs in the downlink, each of the communication control devices according to the embodiment may count the number of wireless systems that simultaneously use the downlink in margin setting.

Referring to the table 1, although subframe numbers 0 and 5 all indicate the downlink, all the wireless systems may not be completely synchronized with each other and operate. Therefore, the number of wireless systems that execute downlink communication in each subframe may be counted and the common extra margin may be set based on the maximum number of wireless systems. For example, when a configuration 0 indicated in the table 1 is earlier than a configuration 1 indicated in the table 1 by one sub-frame, the downlink is not simultaneously used. Therefore, the communication control devices according to the embodiment count the number of wireless systems that simultaneously use the downlink as one.

In a system such as wireless backhaul, since wireless systems also execute uplink communication, the communication control devices according to the embodiment may also count the wireless systems.

When an asynchronous state needs to be considered, the communication control devices according to the embodiment may reflect a time when slots overlap in a coefficient based on a shift in a time slot, and execute the counting as a real number.

Subsequently, a method for setting the arbitrary extra margin is described. The arbitrary extra margin is a margin that can be arbitrarily set by one communication control device. The arbitrary extra margin is provided to absorb a change in an allocated margin amount per communication control device that may occur due to a change in the total number of wireless systems within one communication control device.

The arbitrary extra margin is disclosed in, for example, the foregoing U.S. Pat. No. 9,736,784. A method for appropriately setting an extra margin, however, is not disclosed in any of the Patent Documents. The same method as the method for setting the common extra margin, however, can be used for the arbitrary extra margin.

Although the embodiment describes the expressions such as the communication control devices and the wireless systems, the embodiment of the present disclosure does not need to be limited to this.

For example, the embodiment does not need to be limited to the frequency band in which the spectrum access is executed. In this case, a network manager may include the functions of the communication control device according to the embodiment. The network manager may be a centralized base band unit (BBU) with a network configuration called a centralized RAN or may be a device including the centralized BBU. In addition, the functions of the network manager according to the embodiment may be included in a wireless base station or an access point. In this case, the wireless systems described in the embodiment may be replaced with "terminals", and the "terminals" may be used.

In general, in the spectrum access, an existing system that uses a target band is referred to as primary system, and secondary users may be referred to as secondary systems. In the embodiment of the present disclosure, the systems may be replaced with other terms, and the other terms may be implemented. For example, a macro cell in a heterogeneous network (HetNet) may be the primary system, and small cells or relay stations may be the secondary systems. In addition, a base station may be the primary system, and relay UE or vehicle UE that exists in coverage of the base station and achieves D2D or V2X may be the secondary systems. The base station is not limited to be a fixed type and may be of a portable type or a mobile type.

1.3. Example of Configuration

Figure 19:
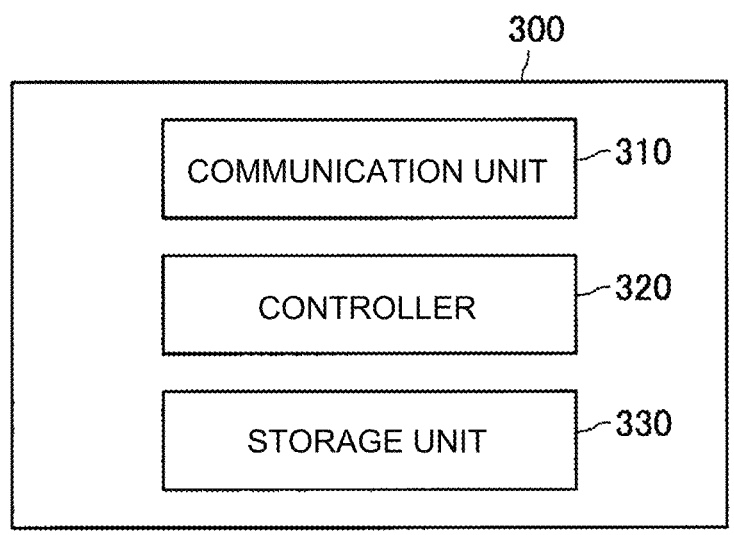
FIG. 19 is an explanatory diagram illustrating an example of a functional configuration of the communication control device according to the embodiment.

Subsequently, an example of a functional configuration of each of the communication control devices according to the embodiment of the present disclosure is described. FIG. 19 is an explanatory diagram illustrating the example of the functional configuration of the communication control device 300 according to the embodiment of the present disclosure. The example of the functional configuration of the communication control device 300 according to the embodiment of the present disclosure is described using FIG. 19.

As illustrated in FIG. 19, the communication control device 300 according to the embodiment of the present disclosure includes a communication unit 310, a controller 320, and a storage unit 330.

The communication unit 310 communicates with another device based on control of the controller 320. In the embodiment, the communication unit 310 transmits information to be used to control a wireless device 100 managed by the communication control device 300, transmits information on the wireless device managed to the other communication control devices, and receives information on wireless devices managed from the other communication control devices. As illustrated in FIG. 12, when only one of the communication control devices sets the common extra margin, and the other communication control devices acquire information of the setting of the common extra margin from the communication control device that has set the common extra margin, the communication unit 310 transmits, to the other communication control devices, information of the setting of the common extra margin set by the controller 320.

The controller 320 controls operations of the communication control device 300. Specifically, the controller 320 calculates the foregoing various margins based on information managed by the communication control device 300 and the information acquired by the communication unit 310. The controller 320 may be composed of, for example, a processor such as a central processing unit (CPU) and storage devices such as a read only memory (ROM) and a random access memory (RAM).

The storage unit 330 stores information, a computer program, and the like that are used for the operations of the communication control device 300. The storage unit 330 stores, for example, the foregoing frequency management databases. The frequency management databases stored in the storage unit 330 are updated by the controller 320. The storage unit 330 may be composed of, for example, various recording devices that are a hard disk drive (HDD) and the like. The foregoing frequency management databases may be stored in a different device from the communication control device 300. In this case, the communication control device 300 updates and references the frequency management databases stored in the different device.

2. Conclusion

As described above, according to the embodiment of the present disclosure, the communication control devices 300 are provided. The communication control devices 300 enable the secondary systems to flexibly operate radio waves while reducing a recalculation load of the interference control that may occur due to a change, caused by the setting of the three types of margins, in operation states of the wireless systems within a time interval between periodical exchanges of information between the databases.

The steps of the processes to be executed by the devices described in the present specification do not need to be chronologically executed in the order described as the sequence diagrams or the flowchart. For example, the steps of the processes to be processed by the devices may be processed in different order from the order described as the flowchart or may be processed in parallel.

In addition, a computer program that demonstrates the same functions as the configurations of the foregoing devices can be generated by hardware that is CPUs, ROMs, RAMS, and the like included in the devices. In addition, a storage medium storing the computer program can be provided. Furthermore, the functional blocks illustrated in the functional block diagram may be configured as hardware, and the series of processes can be achieved by the hardware.

Although the preferred embodiment of the present disclosure is described with reference to the accompanying drawings, the technical scope of the present disclosure is not limited to the examples. A person skilled in the art of the present disclosure may find various alterations and modifications within the scope of the technical ideas described in the claims, and it should be understood that they naturally belong to the technical scope of the present disclosure.

The effects described in the present specification are merely descriptive or exemplary and are not limited. Specifically, the techniques according to the present disclosure may achieve other effects obvious to those skilled in the art together with or instead of the foregoing effects.

The following configurations also belong to the technical scope of the present disclosure.

(1)

A communication control device comprising:

a controller that sets an acceptable interference amount of a primary system that is acceptable by a secondary system that secondarily uses a radio wave in a predetermined frequency band allocated to the primary system, wherein in the setting of the acceptable interference amount, the controller sets a first margin to be allocated to the secondary system that is operating, a second margin that absorbs a change in the first margin that has been caused by a change in the total number of secondary systems, and a third margin to be commonly set between the communication control device and another communication control device.

(2)

The communication control device according to (1), wherein in the setting of the third margin, the controller uses information, acquired from the other communication control device, of a secondary system managed by the other communication control device.

(3)

The communication control device according to (2), wherein when the secondary system managed by the other communication control device satisfies a predetermined requirement, the controller sets the third margin to 0.

(4)

The communication control device according to (3), wherein when the secondary system managed by the other communication control device is not an interference source, the controller sets the third margin to 0.

(5)

The communication control device according to (2), wherein when the secondary system managed by the other communication control device is an interference source, the controller sets the third margin to a value larger than 0.

(6)

The communication control device according to (5), wherein the controller sets the third margin using the number of secondary systems managed by the communication control device and the number of secondary systems managed by the other communication control device.

(7)

The communication control device according to (6), wherein the controller sets the third margin to a value obtained by dividing the sum of the number of secondary systems managed by the communication control device and not having an allocated channel and the number of secondary systems managed by the other communication control device and not having an allocated channel by the sum of the number of secondary systems managed by the communication control device and the number of secondary systems managed by the other communication control device.

(8)

The communication control device according to any one of (2) to (7), wherein the controller sets the third margin using the number of secondary systems that simultaneously use a downlink and are among the secondary systems that execute time division duplex.

(9)

The communication control device according to any one of (2) to (8), wherein in the setting of the third margin, the controller uses position information, acquired from the other communication control device, of the secondary system managed by the other communication control device.

(10)

A communication control method comprising:

causing a processor to execute control to set an acceptable interference amount of a primary system that is acceptable by a secondary system that secondarily uses a radio wave in a predetermined frequency band allocated to the primary system, wherein in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set.

(11)

A computer program causing a computer to execute control to set an acceptable interference amount of a primary system that is acceptable by a secondary system that secondarily uses a radio wave in a predetermined frequency band allocated to the primary system, wherein in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set.

REFERENCE SIGNS LIST

100a Wireless device
100b Wireless device
100c Wireless device
100d Wireless device
100e Wireless device
200a Terminal
200b Terminal
200c Terminal
200d Terminal
300a Communication control device
300b Communication control device
300c Communication control device

The invention claimed is:

1. A communication control device configured to operate in a wireless communication network and comprising:

a transceiver; and a controller configured to set an acceptable interference amount of a primary system that is an amount of interference caused by a secondary system and that is acceptable by the primary system, the secondary system secondarily using a radio wave in a predetermined frequency band allocated to the primary system, wherein in the setting of the acceptable interference amount, the controller sets a first margin to be allocated to the secondary system that is operating, a second margin that absorbs a change in the first margin that has been caused by a change in the total number of secondary systems, and a third margin to be commonly set between the communication control device and another communication control device, wherein the amount of interference caused by the secondary system and that is acceptable by the primary system comprises each of the first margin, the second margin and third margin.

2. The communication control device according to claim 1, wherein in the setting of the third margin, the controller uses information, acquired from the other communication control device, of a secondary system managed by the other communication control device.

3. The communication control device according to claim 2, wherein when the secondary system managed by the other communication control device satisfies a predetermined requirement, the controller sets the third margin to 0.

4. The communication control device according to claim 3, wherein when the secondary system managed by the other communication control device is not an interference source, the controller sets the third margin to 0.

5. The communication control device according to claim 2, wherein when the secondary system managed by the other communication control device is an interference source, the controller sets the third margin to a value larger than 0.

6. The communication control device according to claim 5, wherein the controller sets the third margin using the number of secondary systems managed by the communication control device and the number of secondary systems managed by the other communication control device.

7. The communication control device according to claim 6, wherein the controller sets the third margin to a value obtained by dividing the sum of the number of secondary systems managed by the communication control device and not having an allocated channel and the number of secondary systems managed by the other communication control device and not having an allocated channel by the sum of the number of secondary systems managed by the communication control device and the number of secondary systems managed by the other communication control device.

8. The communication control device according to claim 2, wherein
the controller sets the third margin using the number of secondary systems that simultaneously use a downlink and are among the secondary systems that execute time division duplex.

9. The communication control device according to claim 2, wherein
in the setting of the third margin, the controller uses position information, acquired from the other communication control device, of the secondary system managed by the other communication control device.

10. The communication control device according to claim 1, wherein the controller is further configured to transmit information about the set acceptable interference amount to at least one of the primary system or the secondary system.

11. A communication control method performed by a communication control device configured to operate in a wireless communication network, the method comprising:
setting an acceptable interference amount of a primary system that is an amount of interference caused by a secondary system and that is acceptable by the primary system, the secondary system secondarily using a radio wave in a predetermined frequency band allocated to the primary system, wherein
in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set,
wherein the amount of interference caused by the secondary system and that is acceptable by the primary system comprises each of the first margin, the second margin and third margin.

12. The communication control method according to claim 11, further comprising:
transmitting information about the set acceptable interference amount to at least one of the primary system or the secondary system.

13. A non-transitory computer readable computer program product containing instructions for causing a wireless communication device to perform a method, the method comprising:
setting an acceptable interference amount of a primary system that is an amount of interference caused by a secondary system and that is acceptable by the primary system, the secondary system secondarily using a radio wave in a predetermined frequency band allocated to the primary system, wherein
in the setting of the acceptable interference amount, a first margin to be allocated to the secondary system that is operating, a second margin that absorbs a change in the first margin that has been caused by a change in the total number of secondary systems, and a third margin to be commonly set between the communication control device and another communication control device are set,
wherein the amount of interference caused by the secondary system and that is acceptable by the primary system comprises each of the first margin, the second margin and third margin.

14. The non-transitory computer readable computer program product according to claim 13, wherein the method further comprises:
transmitting information about the set acceptable interference amount to at least one of the primary system or the secondary system.

* * * * *